United States Patent [19]
Berg

[11] 3,881,514
[45] May 6, 1975

[54] QUICK DISCONNECT COUPLING

[75] Inventor: David A. Berg, Milwaukee, Wis.

[73] Assignee: Allis-Chalmers Corporation, Milwaukee, Wis.

[22] Filed: Jan. 2, 1974

[21] Appl. No.: 430,194

[52] U.S. Cl. ................... 137/614.04; 137/614.06
[51] Int. Cl. ............................................. F16l 37/28
[58] Field of Search..... 137/614.04, 614.06, 614.11, 137/344, 515, 798, 613, 614, 614.05; 251/231, 233; 205/1

[56] References Cited
UNITED STATES PATENTS

| | | | |
|---|---|---|---|
| 2,310,073 | 2/1943 | Greig | 137/344 |
| 2,490,555 | 12/1949 | Songer | 251/231 |
| 3,279,827 | 10/1966 | Brown | 137/614.06 X |
| 3,301,272 | 1/1967 | Pettyjohn et al | 137/614.06 |
| 3,664,375 | 5/1972 | Marette | 137/614.06 X |

Primary Examiner—Manuel A. Antonakas
Assistant Examiner—Ira S. Lazarus
Attorney, Agent, or Firm—Arthur L. Nelson

[57] ABSTRACT

A hydraulic coupling for connecting and disconnecting hydraulic lines. The coupling includes a lever to facilitate connection and disconnection and is adapted for mounting on a tractor. The lever selectively biases the coupling to an engaging or disengaging position while a section of the coupling is connected or disconnected from the other section of the coupling.

10 Claims, 7 Drawing Figures

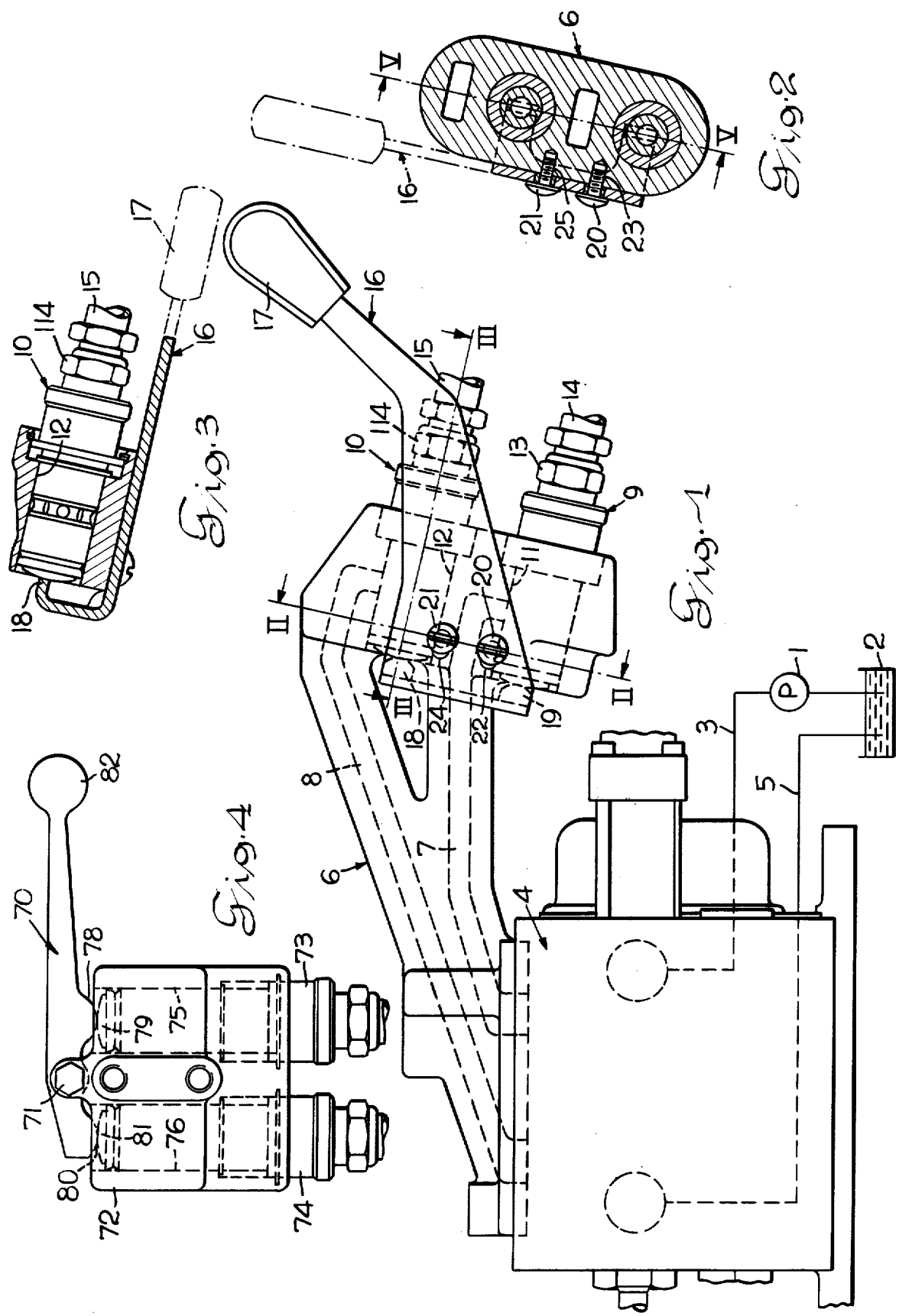

3,881,514

QUICK DISCONNECT COUPLING

This invention relates to a hydraulic coupling and more particularly to a mechanism to facilitate manual connection and disconnection of a coupling as well as permitting automatic disconnecting of the coupling response to a decoupling force.

The modern tractor employs a hydraulic system with a number of hydraulic motors to perform various operations on the tractor and the implement. The increase in hydraulic operations through a hydraulic system on the modern tractor is in part motivated because of the increased size of the tractor which prevents their operation through manual means. A further reason for including a hydraulic system and hydraulic motors to perform these functions is a matter of convenience for the operator.

Accordingly, the hydraulic lines connecting the engine driven pump to hydraulic motors on the implement require a coupling to permit connection and disconnection of the coupling when the implement is coupled or decoupled. Accordingly, this invention provides a means to facilitate connection and disconnection of the hydraulic lines to the implement by a conveniently operated lever.

It is an object of this invention to provide a hydraulic coupling including a lever for selectively pivoting in each of two directions to connect and disconnect the coupling.

It is another object of this invention to provide a hydraulic coupling having a lever to facilitate manual connection and disconnection and a coupling and having automatic release response to a decoupling force.

It is a further object of this invention to provide a hydraulic coupling means with a lever to selectively release one of the two couplings by pivoting in the fore direction and one in the aft direction by releasing a locking sleeve on the two couplings.

The objects of this invention are accomplished by providing a pair of couplings for supplying and returning hydraulic fluid from the tractor to the implement. Each of the couplings is provided with an automatic decoupling arrangement which decouples the hydraulic lines to and from the implement in response to a decoupling force from the implement when the implement is decoupled.

More specifically this invention provides for a lever which is mounted on the supporting structure for the couplings. The lever includes a provision for pivoting fore and aft to selectively disconnect one or the other of the couplings. The lever biases a locking sleeve against a spring biasing force which normally locks the locking sleeve to lock the coupling. In controlling the position of the locking sleeve by the lever the heavy force of the spring biasing the locking sleeve to the locking position is overcome permitting connection or disconnection of each of the couplings connecting the hydraulic lines between the implement and the tractor.

The drawings illustrate the preferred embodiments of this invention.

FIG. 1 illustrates a side elevation view of the connecting and disconnecting mechanism for the couplings.

FIG. 2 is a cross section view taken on line II—II of FIG. 1.

FIG. 3 is a cross section view taken on line III—III of FIG. 1.

FIG. 4 is a modification of the connecting and disconnecting mechanism for the couplings.

Figure 5:
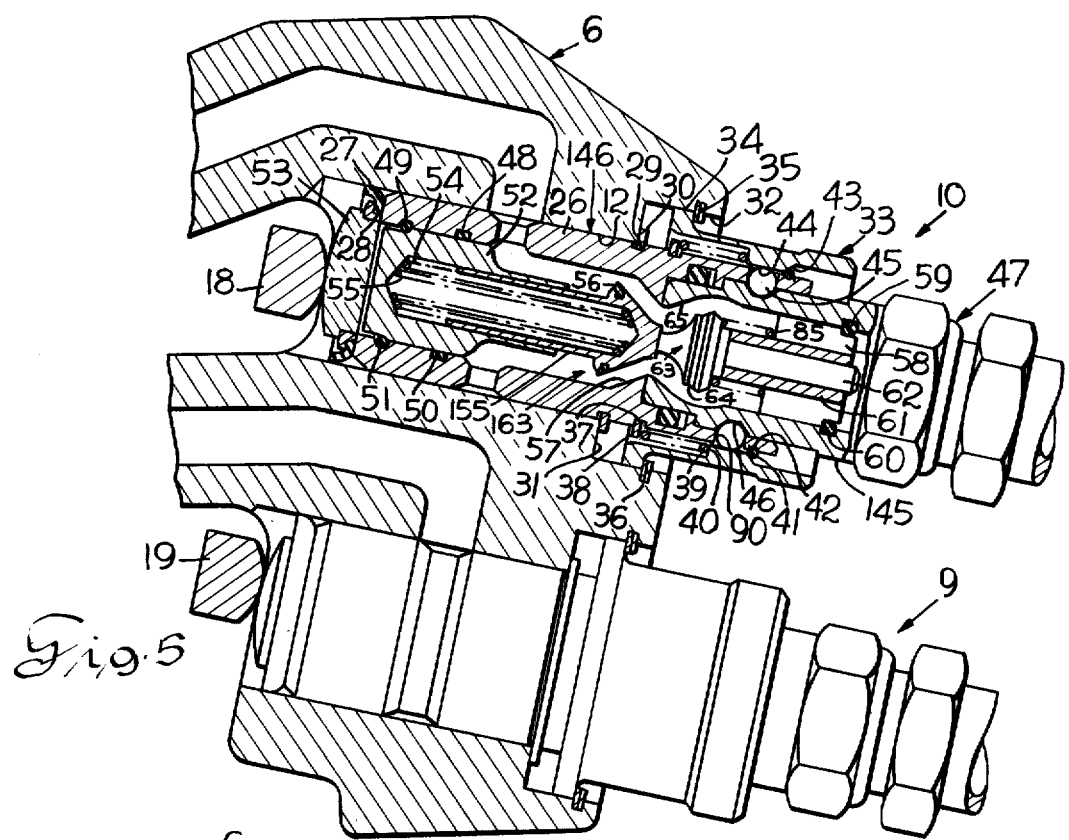
FIG. 5 is a partial cross section view of one of the couplings and the housing supporting the couplings taken on line V—V of FIG. 2.

Referring to the drawings, FIG. 1 illustrates a side elevation view for facilitating connecting and disconnecting of the couplings. A pump 1 receives fluid from the reservoir 2 and pressurizes fluid in the conduit 3 which is supplied to the control valve 4. The control valve 4 returns fluid through the return conduit 5 to the reservoir 2. Mounted on the valve 4 is the housing 6. The valve 4 and the housing 6 are adapted for mounting on the vehicle chassis.

The housing 6 forms a supply passage 7 and a return passage 8 for the couplings 9 and 10. The selection of passage 7 as a supply passage is merely illustrative and not limiting since either passage 7 or 8 may be used as a supply or return passage depending on the connection to the valve 4 and the implement being operated by the hydraulic fluid.

The coupling 9 is mounted in a bore 11 while coupling 10 is mounted in a bore 12. The coupling 9 includes a fitting 13 connected to the hose 14 which is adapted for connection to an implement. Similarly the fitting 114 is connected to the hose 15 which is adapted for connection to an implement.

The lever 16 includes a handle 17 and an arm 18 as well as an arm 19. The lever 16 is supported on the housing 6 by means of the pins 20 and 21. Pin 20 is received in the slot 22 and threadedly engages the housing in the threaded opening 23. The pin 21 is received in a slot 24 of the lever 16 and threadedly engages an opening 25 in the housing 6.

Each of the couplings are interchangeable in the housing. The coupling 10 is shown in cross section in FIGS. 5 and 7. The cylindrical casing 26 is received within the bore 12. A resilient washer 27 received in the annular recess 28 forms a seal in the rearward end of the bore 12. An annular recess 29 receives a snap ring 30 to form a stop which engages the radial facing 31 adjoining the surfaces of the enlarged diameter bore 32 with the bore 12.

Locking sleeve 33 embraces the cylindrical casing 26 and has a shoulder 34 which engages the snap ring 35 in the annular recess 36. The annular recess 37 also retains a snap ring 38. The spring 39 is compressively positioned between the snap ring 38 and the seating surface 40 on the locking sleeve 33. The spring 39 produces a biasing force to press the snap ring 30 against the radial facing 31 and position the casing 26 in its rearward position. FIG. 5 illustrates the coupling in its connected position.

In this position the snap ring 41 seated in the annular recess 42 of the cylindrical casing 26 engages the tapered surface 43 on the locking sleeve 33. The internal cylindrical facing 44 of locking sleeve 33 biases the spherical elements 45 to a locking position in the annular groove 46 on the external periphery of the tubular member 145. This locks the socket section 146 with the plug section 47.

The cylindrical casing 26 is formed with an annular groove 48 and an annular groove 49. The groove 48 receives the seal 50 while the groove 49 receives the snap ring 51. Snap ring 51 limits relative movement between the cylindrical casing 26 and the spring retainer 52. The button 53 is seated within a cylindrical opening in casing 26 and has a peripheral shoulder for engaging the end of the cylindrical casing 26. The button 53 engages the arm 18.

The spring retainer 52 receives two springs 54 and 55 which are compressively positioned between the spring retainer 52 and the valve element 155. The valve element 155 forms a recess for receiving the seal 56 which engages a conical surface 57 on the internal periphery of the cylindrical casing 26 in the position shown in FIG. 7 when the valve is closed and the coupling is disconnected.

The plug section 47 receives a bushing 58 and is limited in its movement in the right-hand direction by the snap ring 59 which is received in the annular recess 60 of the tubular member 145. The bushing 58 includes a liner 61 which embraces the stem 62 of the plunger 53. The plunger 63 forms an annular recess for receiving seal 64 which engages the tapered surface 65 when the valve 66 is closed.

Referring to FIG. 4 a modification of this device is illustrated. The lever 70 is pivotally mounted on a pin 71 which is supported in the housing 72. The couplings 73 and 74 are mounted within the bores 75 and 76, respectively. The cam surface 78 engages a button 79 while the cam surface 80 engages the button 81. The couplings 73 and 74 are essentially the same as the couplings 9 and 10 positioned in the preferred embodiment. Movement of the handle 82 of the lever 70 in either of two directions selectively disengages the couplings 73 or 74 similarly to that operation as provided for the preferred embodiment as shown in the other Figs.

The operation of this device will be described in the following paragraphs.

The couplings 9 and 10 are in their operating position as shown in FIG. 5. The springs 54 and 55 produce a greater expansive force against the valve element 155 than the force of spring 85 against the plunger 63. In this position each of the valves 63 and 163 are in the open position permitting the flow of fluid through the passage in the coupling. The opening of these valves is automatic when the coupling is put in the operative position as shown in FIG. 5.

Figures 6, 7:
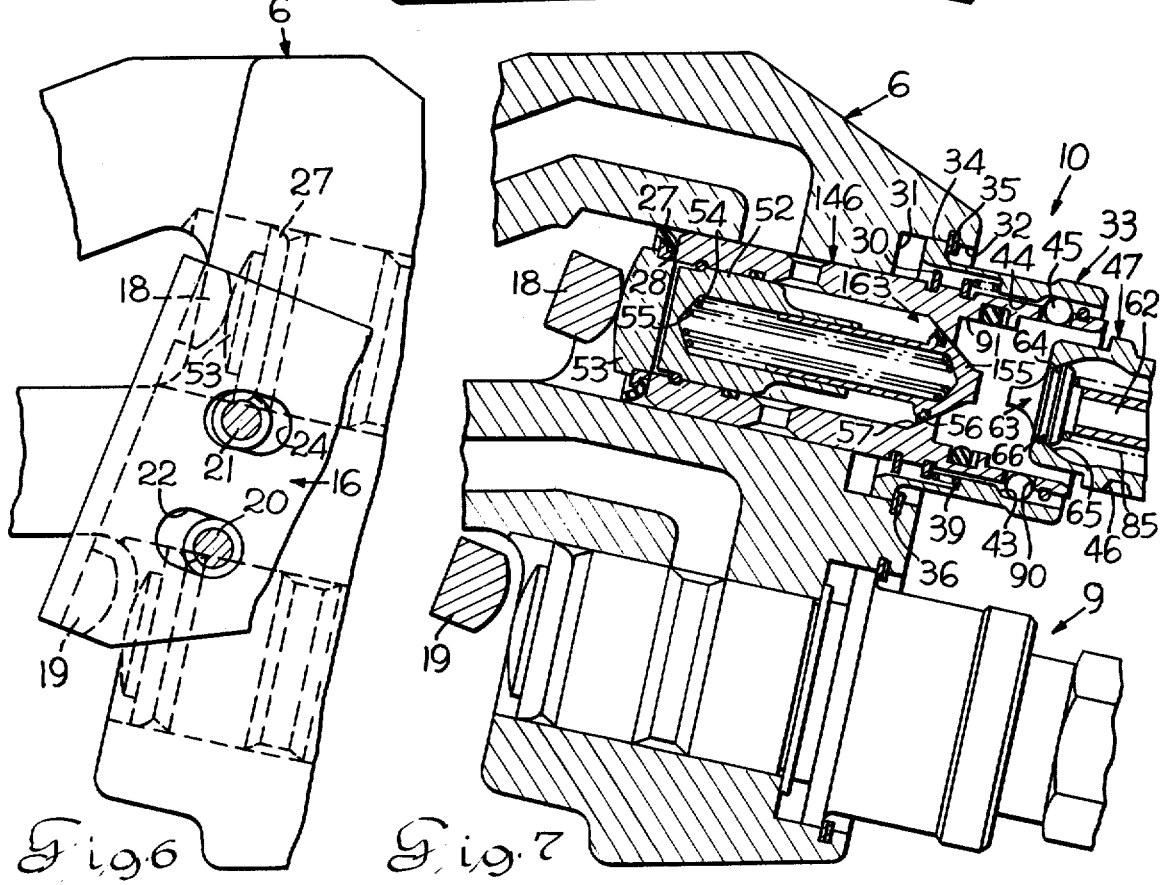
FIG. 6 is a fragmentary view of the lever pivoted for disconnecting one of the couplings.
FIG. 7 is a cross section view with a portion of the lever pivoted to a position to disconnect or connect one of the couplings, and in the same position as FIG. 6.

When it is desired to decouple the coupling 10 the lever 16 is pivoted in a clockwise direction. This positions a slot 22 in the extreme left-hand position as shown in which the pin 20 engages the right-hand surface of the slot 22. The arm 18 of the lever 16 is engaging the button 53 and presses the button in the right-hand direction to move the coupling against the compressive force of the spring 39. This in turn moves the snap ring 30 away from the radial facing 31 and moves the locking elements 45 out from under the internal facing 44 of locking sleeve 33. When the locking elements are moved to engage the conical surface 43 they are allowed to move radially within their openings 90. In this position the locking of the locking elements 45 in groove 46 is released and the plug section 47 can be removed as shown in FIG. 7.

The reverse process is used to connect the coupling. FIG. 7 illustrates the lever 16 pivoted in the extreme clockwise direction which releases the locking elements 45 in the radial openings 90. As the plug section 47 is inserted in the socket section 146 the locking elements are expanded within the locking sleeve 33 to allow the plug section to move fully within the opening 91. As the plug section is pressed in the left-hand direction the lever 16 will be rotated counterclockwise and the spherical elements 45 will be pressed inwardly by the tapered surface 43. When the locking elements are completely pressed into their seat in the annular groove 46 the spherical elements 45 will then slide under the internal facing 44 and the coupling is locked as shown in FIG. 5.

In the process of coupling and decoupling the lever 16 is rotated clockwise or counterclockwise. In rotating the lever in the clockwise direction the decoupling force is produced by the pin 20 on the right-hand surface of the slot 22. The manual force on the lever 16 also produces a decoupling force which biases the coupling 10 in the right-hand direction. The lever is allowed to pivot about the pin 20 while the slot 24 moves relative to pin 21 as shown in FIG. 6. This moves the coupling in the right-hand direction to release the locking and allow decoupling of the coupling 10.

When the coupling 9 is released the lever 16 is rotated in the counterclockwise direction and the decoupling force is created by the pin 21 bearing against the right-hand arcuate surface of the slot 24 and the manual force on the lever. This causes the coupling 9 to move in the right-hand direction until the locking sleeve 33 permits the locking elements 45 to expand radially within their opening 90 and release plug section 47 from the socket section 146.

FIG. 1 and FIG. 5 illustrate the lever in its neutral position. In this position the compression spring 39 in each of the two couplings 9 and 10 biases the lever to a neutral position as shown. When the lever is biased to a neutral position as shown the couplings are connected as shown in FIG. 4 illustrates a modification of the coupling. The modification shown in FIG. 4 operates in the same manner as that described for the preferred embodiment. The lever 82 is rotated in a clockwise or counterclockwise direction to release the coupling 73 or 74.

The embodiments of the invention in which an exclusive property or privilege is claimed are defined as follows:

1. A hydraulic coupling means for use in a hydraulic system comprising, a housing defining radial passages and a first and a second bore having axes in parallel relationship, a coupling including, a socket section including a cylindrical casing means with a closed end mounted in each of said bores, locking means carried on said casing means, a locking sleeve engaging said locking means, resilient means biasing said sleeve to a normal locking position, a plug section including a tubular member for reception in said socket section, valve means in said coupling permitting flow through said coupling when said coupling is connected and interrupting flow when said coupling is disconnected, a release lever pivotally mounted on said housing, means pivotally supporting said lever for selective and alternative pivotal movement for selective release of said couplings, a pair of arms on said lever with each arm engaging the closed end of a mating of said casing means for selectively biasing said casing means against said resilient means to a disengaging position relative to said locking sleeve by pivoting said lever to release one coupling in a fore direction and in an aft direction to release the other coupling.

2. A hydraulic coupling means for use in a hydraulic system as set forth in claim 1 wherein each of said couplings includes a cap on the closed end of the casing means of said coupling, means on each arm of said lever for engaging a cap for biasing said coupling in a forward direction when said lever is pivoted.

3. A hydraulic coupling means for use in a hydraulic system as set forth in claim 1 wherein said means pivotally supporting said lever includes said lever defining a first and a second slot, a first and a second pivot pin selectively positioned in said first and second slot, said lever pivoting on said first pin while said second pin moves in said second slot when one of said couplings is decoupled.

4. A hydraulic coupling means for use in a hydraulic system as set forth in claim 1 including a single pin pivotally connecting said lever to said housing to selectively pivot said lever in either of two directions for disconnecting said couplings.

5. A hydraulic coupling means for use in a hydraulic system as set forth in claim 1 wherein said resilient means defines a spring biasing said locking sleeve to engage said housing in one direction and said cylindrical casing means to engage said housing in the opposite direction to thereby bias said coupling to a normally connected position.

6. A hydraulic coupling means for use in a hydraulic system as set forth in claim 1 wherein said means pivotally supporting said lever includes means mounting said lever on the side of said housing, said arms on said lever extending to the center of said housing to engage the ends at said casing means.

7. A hydraulic coupling means for use in a hydraulic system as set forth in claim 1 including means pivotally supporting said lever on an axes normal to the axes of said couplings.

8. A hydraulic coupling means for use in a hydraulic system as set forth in claim 1 wherein each of said couplings define an axis, said lever includes said arms with a first arm engaging a first coupling, a second arm engaging a second coupling whereby each of said arms engage a mating coupling on the axis of the coupling.

9. A hydraulic coupling means for use in a hydraulic system as set forth in claim 1 wherein said lever pivots about an axis centrally and normally to said axes of said bores in a fore and aft direction to selectively release a first or second coupling when said lever is pivoted.

10. A hydraulic coupling means for use in a hydraulic system as set forth in claim 1, said resilient means of each of said couplings biases said cylindrical casing means in a rearward direction for engagement with said arms of said lever, said resilient means thereby biasing said lever to a neutral position when said couplings are in the connected position.

* * * * *